(12) United States Patent
Uchida et al.

(10) Patent No.: US 7,892,450 B2
(45) Date of Patent: Feb. 22, 2011

(54) LIQUID CRYSTALLINE POLYMER COMPOSITION AND MOLDED ARTICLE MADE OF THE SAME

(75) Inventors: Hiroto Uchida, Osaka (JP); Hitoshi Tsuchiya, Osaka (JP); Tomoyuki Saito, Osaka (JP); Hiroyuki Kato, Osaka (JP)

(73) Assignee: Ueno Fine Chemicals Industry, Ltd., Osaka-Fu (JP)

( * ) Notice: Subject to any disclaimer, the term of this patent is extended or adjusted under 35 U.S.C. 154(b) by 98 days.

(21) Appl. No.: 12/107,951

(22) Filed: Apr. 23, 2008

(65) Prior Publication Data

US 2008/0258106 A1    Oct. 23, 2008

(30) Foreign Application Priority Data

Apr. 23, 2007   (JP)   ............... 2007-112961

(51) Int. Cl.
*C09K 19/00*   (2006.01)
*C09K 19/06*   (2006.01)
*C09K 19/52*   (2006.01)
*G02F 1/1333*  (2006.01)

(52) U.S. Cl. ............... 252/299.01; 252/299.6; 428/1.1; 349/117; 349/186; 430/20

(58) Field of Classification Search ............ 252/299.01, 252/299.6; 430/20; 428/1.1; 349/117, 186
See application file for complete search history.

(56) References Cited

U.S. PATENT DOCUMENTS 5,367,012 A    11/1994   Aitken et al.
6,732,243 B2 *  5/2004  Busser et al. ............ 711/162
6,734,243 B2    5/2004   Greiner et al.
6,878,765 B2 *  4/2005  Greiner et al. ............ 524/403
2003/0089887 A1  5/2003  Okamoto et al.

FOREIGN PATENT DOCUMENTS

| EP | 0 359 490 A2 | 3/1990 |
|---|---|---|
| JP | 2-75653 A | 3/1990 |
| JP | 6-32880 A | 2/1994 |
| JP | 7-309634 A | 11/1995 |
| JP | 9-19938 A | 1/1997 |
| JP | 9-22969 A | 1/1997 |
| JP | 10-36641 A | 2/1998 |
| JP | 10-158482 A | 6/1998 |
| JP | 11-48278 A | 2/1999 |
| JP | 11-140283 A | 5/1999 |
| JP | 11-199761 A | 7/1999 |
| JP | 2003-96279 A | 4/2003 |
| JP | 2003-211443 A | 7/2003 |
| JP | 2004-196886 A | 7/2004 |

* cited by examiner

*Primary Examiner*—Geraldina Visconti
(74) *Attorney, Agent, or Firm*—Sughrue Mion, PLLC

(57) ABSTRACT

Provided is a liquid crystalline polymer composition comprising: 100 parts by weight of a LCP, and equal to or more than 0.01 and less than 1 part by weight of a low temperature softening inorganic glass filler whose softening temperature is equal to or less than 550° C. The composition can provide a molded article which cause no or less blister formation upon reflow soldering using a lead-free solder.

17 Claims, No Drawings

LIQUID CRYSTALLINE POLYMER COMPOSITION AND MOLDED ARTICLE MADE OF THE SAME

TECHNICAL FIELD

The instant application relates to a liquid crystalline polymer composition which cause less blister formation when a molded article made of the composition is processed at higher temperatures.

BACKGROUND ART

Thermoplastic liquid-crystalline polymer (which is abbreviated as "LCP" hereinafter) has good properties including heat resistance, mechanical properties such as rigidity, chemical resistance and dimensional accuracy. Due to those properties, LCPs are used not only for manufacturing molded articles but also for a variety of products including fibers and films.

In the information and telecommunication fields, very thin parts are sometimes required. Particularly, personal computers and mobile phones employ highly integrated devices and the art wishes to use downsized, thinner and smaller parts for them. Because of those excellent properties of the LCPs, consumption of LCPs has been increasing in these days.

For mounting electronic components such as connectors, environmentally conscious lead free solders are preferably used in these days. The reflow temperature of the lead free solders are relatively high and the higher temperature sometimes cause blister formation on the surface of the component made of LCP.

In addition, the higher reflow temperatures may also cause warpage of the component. In order to avoid warpage, fillers such as talc have been added to a LCP composition.

Talc comprises small amount of water and the LCP compositions comprising talc have the problem of blister formation because of the water introduced simultaneously with talc.

In order to avoid blister formation on the surface of the molded LCP articles, various strategies have been proposed. For example, adding additives such as silicone gum, phosphoric compound or boric compound to the LCP composition (Japanese Patent Application Laid Open Nos. 02-075653, 06-032880, 10-036641, 10-158482, 11-140283, 11-199761, 2003-096279 and 2004-196886, the references are herein incorporated by reference); controlling the screw compression ratio upon injection molding the LCP (Japanese Patent Application Laid Open No. 11-048278); and adjusting the screw of a kneader for kneading the LCP and the inorganic fillers so that the meshing ratio of the screw is in a certain range (Japanese Patent Application Laid Open No. 2003-211443).

There are various LCP compositions comprising a LCP and a variety of fillers, reinforcements, and additives including the composition comprising a LCP and a low-temperature softening inorganic glass filler (Japanese Patent Application Laid Open Nos. 09-022969, 09-019938, 07-309634).

The LCP compositions comprising low-temperature softening inorganic glass fillers disclosed in the prior art references comprise a relatively large amount of the low temperature softening inorganic glass filler and therefore, the LCP composition cannot be used for manufacturing devices or components used in the field where precise size and shape are required. A LCP composition comprising a LCP and only a small amount of the low temperature softening inorganic glass filler has not been known.

SUMMARY OF THE INVENTION

An object of the present invention is to provide a LCP composition which can provide molded articles with less blister formation.

Namely, the present invention provides a LCP composition comprising: 100 parts by weight of a LCP and equal to or more than 0.01 and less than 1 part by weight of a low temperature softening inorganic glass filler whose softening temperature is equal to or less than 550° C.

BEST MODE FOR CARRYING OUT THE INVENTION

The LCP is liquid-crystalline polyester or liquid-crystalline polyester amide which exhibits anisotropic melt phase and is called as thermotropic LCP by those skilled in the art.

The anisotropic melt phase of the LCP can be confirmed by means of conventional polarized light system using orthogonal light polarizer. In more detail, the sample on the Leitz's hot stage under nitrogen atmosphere may be observed with Leitz's polarization microscope.

Examples of repeating units in the LCP are aromatic oxycarbonyl, aromatic di-carbonyl, aromatic dioxy, aromatic aminooxy, aromatic aminocarbonyl, aromatic diamino, aromatic oxydicarbonyl and aliphatic dioxy repeating units.

The LCP composed of the above described repeating units may include both of those give anisotropic melt phase and those do not, depending on structural components of the polymer and ratio and sequence distribution of the components. The LCP used for the present invention is limited to those exhibit anisotropic melt phase.

Examples of monomers which provide the aromatic oxycarbonyl repeating units are p-hydroxybenzoic acid, m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxybiphenyl-4-carboxylic acid, 3'-hydroxybiphenyl-4-carboxylic acid, 4'-hydroxybiphenyl-3-carboxylic acid, and alkyl-, alkoxy- or halogen-substituted derivatives thereof as well as ester forming derivatives such as acyl derivatives, ester derivatives and acyl halide thereof. Among the above, p-hydroxybenzoic acid and 6-hydroxy-2-naphthoic acid are preferable in terms of easier control of the properties and the melting point of the resulting LCP.

Examples of monomers which provide the aromatic dicarbonyl repeating units are aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl, and alkyl-, alkoxy or halogen-substituted derivatives thereof as well as ester forming derivatives such as ester derivatives, acid halide thereof. Among the above, terephthalic acid and 2,6-naphthalenedicarboxylic acid are preferable in terms of easier control of the mechanical properties, heat resistance, melting point and molding properties of the resulting LCP.

Examples of monomers which provide the aromatic dioxy repeating units are aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether, and alkyl-, alkoxy- or halogen-substituted derivatives as well as ester forming derivatives such as acyl derivatives thereof. Among the above, hydroquinone and 4,4'-dihydroxybiphenyl are preferable in terms of the good reactivity during the polymerization process and the good properties of the resulting LCP blend.

Examples of monomers which provide the aromatic aminooxy repeating units are aromatic hydroxyamines such as p-aminophenol, m-aminophenol, 4-amino-1-naphthol, 5-amino-1-naphthol, 8-amino-2-naphthol, 4-amino-4'-hydroxybiphenyl, and alkyl-, alkoxy- or halogen-substituted derivatives as well as ester forming derivatives such as acyl derivatives thereof and amide forming derivatives such as N-acyl derivatives thereof.

Examples of monomers which provide the aromatic diamino repeating units are aromatic diamines such as p-phenylenediamine, m-phenylenediamine, 1,5-diaminonaphthalene, 1,8-diaminonaphthalene and alkyl-, alkoxy- or halogen-substituted derivatives as well as amide forming derivatives such as N-acyl derivatives thereof.

Examples of monomers which provide the aromatic aminocarbonyl repeating units are aromatic aminocarboxylic acids such as p-aminobenzoic acid, m-aminobenzoic acid, 6-amino-2-naphthoic acid, and alkyl-, alkoxy- or halogen-substituted derivatives as well as ester forming derivatives such as acyl derivatives, ester derivatives and acid halide thereof and amide forming derivatives such as N-acyl derivatives thereof.

Examples of monomers which provide the aromatic oxydicarbonyl repeating units are hydroxy-aromatic dicarboxylic acids such as 3-hydroxy-2,7-naphthalenedicarboxylic acid, 4-hydroxyisophthalic acid, 5-hydroxyisophthalic acid, and alkyl-, alkoxy- or halogen-substituted derivatives thereof as well as ester forming derivatives such as acyl derivatives, ester derivatives and acyl halide thereof.

Examples of monomers which provide the aliphatic dioxy repeating units are aliphatic diols such as ethylene glycol, 1,4-butanediol, 1,6-hexanediol, and acyl derivatives thereof. In addition, the LCP having an aliphatic dioxy repeating unit can be obtained by reacting polyesters having the aliphatic dioxy repeating units such as polyethylene terephthalate or polybutylene terephthalate with the above aromatic oxycarboxylic acids, aromatic dicarboxylic acids, aromatic diols, aromatic hydroxyamines, aromatic aminocarboxylic acids, aromatic diamines or acyl derivatives, ester derivatives or acid halide thereof.

The LCP used for the present invention may have thioester bonding unless the bonding does not impair the object of the present invention. Examples of monomers which provide thioester bonding are mercapto-aromatic carboxylic acid, aromatic dithiol and hydroxy-aromatic thiol. The proportion of these additional monomers based on the total amount of monomers which provide aromatic oxycarbonyl, aromatic di-carbonyl, aromatic dioxy, aromatic aminooxy, aromatic diamino, aromatic oxy di-carbonyl and aliphatic dioxy repeating units is preferably not more than 10 mol %.

Among the above, the preferred LCPs used for the present invention are those comprising aromatic oxycarbonyl repeating unit including 4-oxybenzoyl repeating unit and/or 6-oxy-2-naphthoyl repeating unit.

Examples of the preferred LCPs comprising 4-oxybenzoyl and/or 6-oxy-2-naphthoyl repeating units may include:
1) 4-hydroxybenzoic acid/6-hydroxy-2-naphthoic acid copolymer,
2) 4-hydroxybenzoic acid/terephthalic acid/4,4'-dihydroxybiphenyl copolymer,
3) 4-hydroxybenzoic acid/terephthalic acid/isophthalic acid/4,4'-dihydroxybiphenyl copolymer,
4) 4-hydroxybenzoic acid/terephthalic acid/isophthalic acid/4,4'-dihydroxybiphenyl/hydroquinone copolymer,
5) 4-hydroxybenzoic acid/terephthalic acid/hydroquinone copolymer,
6) 6-hydroxy-2-naphthoic acid/terephthalic acid/hydroquinone copolymer,
7) 4-hydroxybenzoic acid/6-hydroxy-2-naphthoic acid/terephthalic acid/4,4'-dihydroxybiphenyl copolymer,
8) 6-hydroxy-2-naphthoic acid/terephthalic acid/4,4'-dihydroxybiphenyl copolymer,
9) 4-hydroxybenzoic acid/6-hydroxy-2-naphthoic acid/terephthalic acid/hydroquinone copolymer,
10) 4-hydroxybenzoic acid/2,6-naphthalene dicarboxylic acid/4,4'-dihydroxybiphenyl copolymer,
11) 4-hydroxybenzoic acid/terephthalic acid/2,6-naphthalene dicarboxylic acid/hydroquinone copolymer,
12) 4-hydroxybenzoic acid/2,6-naphthalene dicarboxylic acid/hydroquinone copolymer,
13) 4-hydroxybenzoic acid/6-hydroxy-2-naphthoic acid/2,6-naphthalene dicarboxylic acid/hydroquinone copolymer,
14) 4-hydroxybenzoic acid/terephthalic acid/2,6-naphthalene dicarboxylic acid/hydroquinone/4,4'-dihydroxybiphenyl copolymer,
15) 4-hydroxybenzoic acid/terephthalic acid/4-aminophenol copolymer,
16) 6-hydroxy-2-naphthoic acid/terephthalic acid/4-aminophenol copolymer,
17) 4-hydroxybenzoic acid/6-hydroxy-2-naphthoic acid/terephthalic acid/4-aminophenol copolymer,
18) 4-hydroxybenzoic acid/terephthalic acid/4,4'-dihydroxybiphenyl/4-aminophenol copolymer,
19) 4-hydroxybenzoic acid/terephthalic acid/ethylene glycol copolymer,
20) 4-hydroxybenzoic acid/terephthalic acid/4,4'-dihydroxybiphenyl/ethylene glycol copolymer,
21) 4-hydroxybenzoic acid/6-hydroxy-2-naphthoic acid/terephthalic acid/ethylene glycol copolymer, and
22) 4-hydroxybenzoic acid/6-hydroxy-2-naphthoic acid/terephthalic acid/4,4'-dihydroxybiphenyl/ethylene glycol copolymer.

Among the above, copolymers of 1), 9) and 13) are especially preferable in view of moldability and mechanical properties of the polymer.

The LCP of the instant invention may be a polymer blend comprising two or more LCPs for the purpose of increasing flowability of the polymer upon molding.

The method for preparing the LCP used for the present invention is not limited and any method known to the art can be employed. For example, conventional polycondensation methods such as molten acidolysis and slurry polymerization methods for preparing polymer to give ester and/or amide bonding among the above described monomer components may be employed.

The molten acidolysis method is preferably used for preparing the LCP. In this method, the monomers are heated to give molten solution and then the solution is reacted to give the molten polymer. The final step of this method may be carried out under vacuum to facilitate remellipse of the volatile by-products such as acetic acid or water.

The slurry polymerization method is characterized in that monomers are reacted in a heat-exchange fluid to give solid state polymer in the form of suspension in the heat-exchange liquid medium.

In either of the molten acidolysis method or the slurry polymerization method, the polymerizing monomer may be in the form of lower acyl derivative obtained by acylating the hydroxyl group and/or amino group. The lower acyl group may have preferably 2-5, more preferably 2-3 carbon atoms. Acetylated monomers are most preferably used for the reaction.

The lower acyl derivatives of the monomers may be those prepared beforehand by acylating the monomers independently or may be those produced in the reaction system by adding an acylating agent such as acetic anhydride to the monomers upon preparing the LCP.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; titanium dioxide; antimony trioxide; organic titanium compounds such as alkoxy titanium silicate and titanium alkoxide; alkaline or alkaline earth metal salt of carboxylic acid such as potassium acetate; salts of inorganic acid (ex. $K_2SO_4$); Lewis acid (ex. $BF_3$) and gaseous acid catalysts such as halogenated hydrogen (ex. HCl).

When a catalyst is used, the amount of the catalyst added to the reaction based on the total amount of the monomers may preferably be 10-1000 ppm, and more preferably 20-200 ppm.

The LCP may be obtained from the polymerizing reaction vessel in molten state and then, processed to give pellets, flakes or powders.

The LCP in the form of pellet, flake or powder may be, if desired, heated in substantially solid state under vacuum or an inert gas, such as nitrogen or helium, atmosphere. The temperature of the heat treatment may be 260-350° C., more preferably 280-320° C.

The LCP used in the invention is preferably has a crystalline melting temperature (Tm) determined by differential scanning calorimeter of 280-360° C.

Method for Determining the Crystalline Melting Temperature

The differential scanning calorimeter (DSC) Exstar 6000 (Seiko Instruments Inc., Chiba, Japan) or the same type of DSC device is used. The LCP sample to be examined is heated from room temperature at a rate of 20° C./minute and the endothermic peak (Tm1) is recorded. Thereafter, the sample is kept at a temperature 20-50° C. higher than Tm1 for 10 minutes. The sample is then cooled to room temperature at the rate of 20° C./minute and is heated again at the rate of 20° C./minute. Endothermic peak found in the final step is recorded as crystalline melting temperature (Tm) of the sample LCP.

The LCP composition of the instant invention is prepared by admixing to the LCP a low temperature softening inorganic glass filler whose softening temperature is equal to or less than 550° C.

The low temperature softening inorganic glass filler used in the present invention has a softening temperature of equal to or less than 550° C., preferably, equal to or less than 500° C.

The lower limit of the softening temperature of the inorganic glass is not limited and is preferably more than the crystalline melting temperature (Tm) of the LCP in the composition and more preferable, 30° C. or more higher than the crystalline melting temperature.

The softening temperatures of the inorganic glass can be measured with a differential thermal analyzer (DTA). The endothermic and exothermic peaks are detected successively from the lower peaks. Among the 1st exothermic peak, the 1st endothermic peak and the 2nd endothermic peak, the softening point is the temperature measured as the 2nd endothermic peak.

Examples of the low temperature softening inorganic glasses may be a glass comprising one or more components selected from the group consisting of $B_2O_3$, $P_2O_5$, ZnO, PbO, $Al_2O_3$, $Na_2O$, $Li_2O$, $K_2O$, $Cu_2O$, $SiO_2$, $SO_3$, SnO, CaO, MgO, SrO, $Sb_2O_3$, $ZrO_2$, BaO, MnO, $V_2O_3$, rare earth-oxide, and rare earth-fluoride.

Among the low temperature softening inorganic glasses obtained as above, lead free glasses are more preferable in view of Restriction of Hazardous Substances in the EU and the like. Among the lead free low temperature softening inorganic glasses, the glasses comprising $P_2O_5$ and ZnO are preferably used in view of the suppressed blister formation of the resulting LCP composition.

The shape of the low temperature softening inorganic glass filler used in the present invention is not specifically limited. In order to the molded article made of the LCP composition of the present invention exhibit suppressed blister formation, the filler should be uniformly dispersed in the molded article and therefore, powder fillers are preferable.

The inorganic glass filler used in the present invention may preferably be a powder filler having a median diameter of 0.1-500 μm and more preferably, 1-100 μm. The diameter or particle size of the inorganic glass filler in this specification and claims refers the diameter determined by laser diffraction particle size distribution meter.

The amount of the low temperature softening inorganic glass filler added to 100 parts by weight of the LCP composition is equal to or more than 0.01 and less than 1 part by weight and preferably, equal to or more than 0.01 and equal to or less than 0.9 part by weight. When the amount of the low temperature softening inorganic glass filler is more than 1 part by weight, the viscosity of the resulting LCP composition at molding may be decreased.

The LCP composition of the present invention comprising the LCP and the low temperature softening inorganic glass filler may be prepared by any known procedures conventionally employed for mixing a resin and a filler. The preferred embodiments are as follows:

1) Dispersing a low temperature softening inorganic glass filler in a LCP by means of melt kneading or similar procedure. In this embodiment, one or more fillers other than a low temperature softening inorganic glass filler and/or one or more additives may be preliminarily dispersed in the LCP or may be dispersed in the LCP simultaneously with the low temperature softening inorganic glass filler;

2) Mixing solid LCP in the form of pellet, flake, or powder, and a low temperature softening inorganic glass filler so that the low temperature softening inorganic glass filler is attached to the surface of the solid LCP. In this embodiment, the solid LCP may be prepared from a LCP composition comprising the LCP and one or more fillers other than a low temperature softening inorganic glass filler and/or one or more additives dispersed therein; and 3) Mixing a solid LCP composition which comprises LCP and a low temperature softening inorganic glass filler dispersed in the LCP obtained by melt kneading or the like, and the same or different low temperature softening inorganic glass filler so that the latter low temperature softening inorganic filler is attached to the surface of the solid LCP composition. In this embodiment, the solid LCP composition may further comprise one or more fillers other than a low temperature softening inorganic glass filler and/or one or more additives dispersed in the composition.

The low temperature softening inorganic glass filler may be dispersed in the LCP composition by means of any known method. For example, Banbury mixer, kneader, single or twin screw extruder and the like may be employed for melt kneading the inorganic glass filler and the LCP. The melt kneading may be conducted at a temperature from around the crystalline melting temperature (Tm) of the LCP to Tm+30° C.

The low temperature softening inorganic glass filler may be mixed with the solid LCP or solid LCP composition by means of any known method. For example, the solid LCP in the form of pellet, flake, powder or the like and the low temperature softening inorganic glass filler may be mixed uniformly with a tumbler mixer or the like. The mixing may be conducted at any temperature the LCP does not melt and typically, at around the room temperature.

The LCP composition of the present invention may further comprise an additional filler selected from fibrous, lamellar and powder fillers in addition to the low temperature softening inorganic glass filler for the better mechanical or surface properties of the molded articles made of the LCP composition.

Examples of the fibrous fillers may include glass fiber, ellipse-shape glass fiber, cocoon-shape glass fiber, silica-alumina fiber, alumina fiber, carbon fiber, aramid fiber, potassium titanate fiber, aluminum borate fiber and wollastonite.

In the specification and claims of the instant application, "glass fiber" refers to those having substantially circular cross section, "ellipse-shape glass fiber" refers to those having substantially ellipse cross section, and "cocoon-shape glass fiber" refers to those having a cross section in the shape made of two overlapping circles. In the definition of "glass fiber", "ellipse-shape glass fiber" and "cocoon shape glass fiber", the term "circle" or "ellipse" refers not only geometrically defined shapes but also the shapes such as square and rectangle having rounded corners that are recognized as circle or ellipse when observed under microscope or the like.

The diameter of the fibrous filler used in the invention is not specifically limited unless it does not impair the object of the present invention and the average diameter may preferably be 0.1-50 µm. In the case of the cross section of the fibrous filler is not circle, the "diameter" represents the longest distance between two points around the cross section of the filler.

Examples of the lamellar and/or powder fillers may include talc, mica, graphite, calcium carbonate, dolomite, clay, glass flake, glass beads, barium sulfate, titanium oxide and diatomite.

According to the present invention, the glass fillers being incorporated as additional fillers in the LCP composition of the present invention are those having softening temperatures of more than 600° C. Some glasses have too high softening temperature to measure the softening temperature by the above described procedure. The additional fillers do not involve glass filler having a softening temperature of equal to or less than 550° C.

The total amount of the additional fillers in the LCP composition of the present invention may be 1-200 parts by weight, preferably 1-150 parts by weight and most preferably 1-100 parts by weight per 100 parts by weight of the LCP.

In view of good mechanical property of the resulting LCP composition, the additional fillers are preferably one or more of fibrous fillers selected from the group consisting of glass fiber, ellipse-shape glass fiber, cocoon-shape glass fiber, silica-alumina fiber, alumina fiber, carbon fiber, aramid fiber, potassium titanate fiber, aluminum borate fiber and wollastonite. Among them, one or more fibrous fillers selected from glass fiber, ellipse-shape glass fiber, cocoon-shape glass fiber are preferably used.

In addition to the fibrous fillers, the LCP composition preferably comprise lamellar or powder fillers such as talc for the purpose of suppressing warpage of the molded article made of the LCP composition.

The LCP composition of the present invention may further comprise one or more additives that are conventionally used for resin compositions, unless they are not impair the object of the invention. For example, molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent; and surface active agent may be admixed. The term "higher aliphatic" used herein refers to those having C10-C25 aliphatic moiety.

Molding lubricants such as higher aliphatic acid, higher aliphatic ester, higher aliphatic acid metal salt or fluorocarbon-type surfactant may be added to the pellets of the LCP composition before subjecting the pellets to the molding process, so that the agent adhere to the outer surface of the pellet.

Similar to the low temperature softening inorganic glass fillers, the additional fillers and the additives may also be added to the LCP composition and melt kneading the mixture using a kneading machine such as Banbury mixer, kneader, single screw extruder, twin screw extruder or the like at a temperature of from around the crystalline melting temperature (Tm) to Tm+30° C.

Thus prepared LCP composition of the present invention may be molded using a conventional method such as injection molding, compression molding, extrusion molding and blow molding into molded article, film, sheet or nonwoven fabric.

The molded articles made of the LCP composition of the present invention causes substantially less blister formation upon, for example, reflow soldering, and therefore, are useful for manufacturing surface mount type electronic components including switches, relays, connectors, condensers, coils, trans, camera modules, antenna and chip antenna switch, especially, the components to be mounted using lead free solders which are treated at higher temperatures.

EXAMPLES

The present invention is further described in reference to the following Examples. The following examples are intended to illustrate the invention and are not to be construed to limit the scope of the invention. In the examples and comparative examples, following materials were used.

LCPs

LCP1: UENO LCP2100 (Ueno Fine Chemicals Industry, Ltd., Osaka, Japan), a copolymer of 4-hydroxy benzoic acid/6-hydroxy-2-naphthoic acid/terephthalic acid/hydroquinone. Crystalline melting temperature (Tm): 330° C.

LCP2: UENO LCP6000 (Ueno Fine Chemicals Industry, Ltd., Osaka, Japan), a copolymer of 4-hydroxy benzoic acid/6-hydroxy-2-naphthoic acid/2,6-naphthalenedicarboxylic acid/terephthalic acid/hydroquinone. Crystalline melting temperature (Tm): 320° C.

Inorganic Glass Fillers

GL1: low temperature softening inorganic glass ZP150 (Asahi Fiber Glass Co., Ltd., Tokyo, Japan), powder filler of $P_2O_5$—ZnO lead free inorganic glass, softening point (measured by the above-described procedure): 496° C., median diameter: 3.3 µm (powder)

GL2: low temperature softening inorganic glass ZP450 (Asahi Fiber Glass Co., Ltd., Tokyo, Japan), powder filler of $P_2O_5$—ZnO lead free inorganic glass, softening point (measured by the above-described procedure) 398° C., median diameter: 2.7 µm.

GL3: milled glass fiber PF 20E-001 (Nitto Boseki Co., Ltd., Fukushima, Japan), fibrous filler of $SiO_2$—CaO—

$Al_2O_3$—$B_2O_3$ inorganic glass, softening point measured according to JIS R3103-1: 840° C., length: 20 μm, diameter: 10 μm Additional Fillers Fibrous Fillers GF1: glass fiber CS 3J-454S (Nitto Boseki Co., Ltd., Fukushima, Japan), glass fiber with circular cross section, average diameter: 10 μm.

GF2: glass fiber CSG 3PA-8315 (Nitto Boseki Co., Ltd., Fukushima, Japan), glass fiber with ellipse-shape cross section, average major axis diameter: 28 μm, major/minor axis ratio: 4.

Lamellar and/or Powder Fillers

Talc 1: DS-34 (Fuji Talc Industrial Co., Ltd., Osaka, Japan), median diameter: 19.8 μm.

Talc 2: HK-A (Fuji Talc Industrial Co., Ltd., Osaka, Japan), median diameter: 24.0 μm.

Examples 1-4 and Comparative Examples 1-3

LCP compositions were prepared by melt kneading 100 parts by weight of LCP1 and the inorganic fillers and additional fillers shown in Table 2 with twin screw extruder (TEX-30α, The Japan Steel Works, LTD. Tokyo, Japan). The resulting compositions were pelletized.

Thus obtained pellets of the LCP composition were subjected to injection molding under the condition shown in Table 1 to give test strips.

TABLE 1

| conditions for molding test strips | |
|---|---|
| molding machine | UH-1000 (Nissei Plastic Industrial Co., Ltd., Nagano, Japan) |
| cylinder temperature | 350-350-350-325-305 (° C.) |
| mold temperature | 70 (° C.) |
| injection speed | 35 mm/sec |
| pressure | 500 kg/cm² |
| injection time | 5 sec |
| cooling time | 8 sec |
| screw speed | 150 rpm |
| screw back pressure | 5 kg/cm² |
| test strip size | 12.7 mm × 0.8 mm × 127 mm |

TABLE 2

| | Fillers in the LCP composition | | | | | |
|---|---|---|---|---|---|---|
| | | | additional fillers | | | |
| | inorganic glass filler | | fibrous filler | | lamellar/powder filler | |
| | amount* | | amount* | | amount* | |
| Ex. 1 | GL1 | 0.15 | — | — | — | — |
| Ex. 2 | GL1 | 0.1 | GF1 | 16.7 | Talc 1 | 50 |
| Ex. 3 | GL1 | 0.3 | GF1 | 16.7 | Talc 1 | 50 |
| Ex. 4 | GL2 | 0.1 | GF1 | 16.7 | Talc 1 | 50 |
| Com. Ex. 1 | — | — | — | — | — | — |
| Com. Ex. 2 | — | — | GF1 | 16.7 | Talc 1 | 50 |
| Com. Ex. 3 | GL2 | 3 | GF1 | 33 | — | — |

*parts by weight per 100 parts by weight of LCP1

LCP composition of comparative example 3 could not be pelletized because the viscosity of the molten composition was too low to form pellets and therefore, the test strip for the evaluation could not prepared. Accordingly, the evaluation of blister formation regarding comparative example 3 was not conducted.

Evaluation of Blister Formation

The test strips were heated in a Geer type oven at the temperature shown in Table 3 for 10 minutes and then left to cool. The blisters formed on the surface of the test strips were visually observed and the number of the blisters on the surface of each test strip was counted. The test was conducted using 10 test strips for each LCP compositions. Results are shown in Table 3.

TABLE 3

| | temp. | number of blisters observed on the surface | | | | | | | | | |
|---|---|---|---|---|---|---|---|---|---|---|---|
| Ex. 1 | 310° C. | 0 | 0 | 0 | 0 | 0 | 0 | 0 | 0 | 0 | 0 |
| Com. Ex. 1 | 310° C. | 0 | 0 | 0 | x | x | x | x | x | x | x |
| Ex. 2 | 300° C. | 0 | 0 | 0 | 0 | 0 | 0 | 0 | 0 | 3 | x |
| Ex. 3 | 300° C. | 0 | 0 | 0 | 0 | 0 | 0 | 0 | 0 | 1 | x |
| Ex. 4 | 300° C. | 0 | 0 | 0 | 0 | 0 | 0 | 0 | 0 | 0 | 0 |
| Com. Ex. 2 | 300° C. | 1 | 2 | 3 | 3 | x | x | x | x | x | x |
| Ex. 2 | 310° C. | 0 | 0 | 0 | 0 | 0 | 0 | 3 | x | x | x |
| Ex. 3 | 310° C. | 0 | 0 | 0 | 0 | 0 | 1 | 1 | 2 | x | x |
| Ex. 4 | 310° C. | 0 | 0 | 0 | 0 | 0 | 0 | 0 | 0 | 2 | x |
| Com. Ex. 2 | 310° C. | x | x | x | x | x | x | x | x | x | x | x: more than 4 blisters were observed on the surface of the test strip

According to the result shown in Table 3, by admixing a small amount of a low temperature softening inorganic glass filler into a LCP, the resulting LCP composition can be heat treated with substantially less blister formation.

Examples 5-7 and Comparative Examples 4-6

LCP compositions were prepared by kneading 100 parts by weight of LCP2 and the inorganic fillers and additional fillers shown in Table 4 with twin screw extruder (TEX-30α, The Japan Steel Works, LTD. Tokyo, Japan) and the resulting compositions were pelletized.

Test strips for evaluation of blister formation were made of thus obtained pellets of the LCP composition in the same manner as above. The blister formation was evaluated in the same manner as above. Results are shown in Table 5.

TABLE 4

| | Fillers in the LCP composition | | | | | |
|---|---|---|---|---|---|---|
| | | | additional fillers | | | |
| | inorganic glass filler | | fibrous filler | | lamellar/powder filler | |
| | amount* | | amount* | | amount* | |
| Ex. 5 | GL2 | 0.1 | GF2 | 66.7 | — | — |
| Ex. 6 | GL2 | 0.5 | GF2 | 66.7 | — | — |
| Ex. 7 | GL2 | 0.1 | GF2 | 16.7 | Talc 2 | 50 |
| Com. Ex. 4 | — | — | GF2 | 66.7 | — | — |
| Com. Ex. 5 | GL3 | 0.1 | GF2 | 66.7 | — | — |
| Com. Ex. 6 | — | — | GF2 | 16.7 | Talc 2 | 50 |

*parts by weight per 100 parts by weight of LCP2

TABLE 5

| | temp. | number of blisters observed on the surface | | | | | | | | | |
|---|---|---|---|---|---|---|---|---|---|---|---|
| Ex. 5 | 290° C. | 0 | 0 | 0 | 0 | 0 | 0 | 1 | 1 | x | x |
| Ex. 6 | 290° C. | 0 | 0 | 0 | 0 | 0 | 0 | 0 | 0 | 0 | 2 |
| Com. Ex. 4 | 290° C. | x | x | x | x | x | x | x | x | x | x |
| Com. Ex. 5 | 290° C. | x | x | x | x | x | x | x | x | x | x |
| Ex. 7 | 300° C. | 0 | 0 | 0 | 0 | 0 | 0 | 0 | x | x | x |
| Com. Ex. 6 | 300° C. | 0 | 0 | 0 | x | x | x | x | x | x | x | x: more than 4 blisters were observed on the surface of the test strip

According to Table 5, molded articles made of LCP composition comprising LCP2 and a small amount of a low temperature softening inorganic glass filler exhibited no or very low blister formation.

In addition, as is apparent from comparative example 5, an inorganic glass filler having an softening temperature of more than 550° C. could not suppress blister formation of a molded articles made of the LCP composition comprising said inorganic glass filler.

Example 8 and Comparative Example 7

LCP compositions were prepared by kneading 100 parts by weight of LCP2 and the additional fillers shown in Table 6 with twin screw extruder (TEX-30α, The Japan Steel Works, LTD. Tokyo, Japan) and the resulting compositions were pelletized. The pelletized LCP composition of Example 8 was admixed with the inorganic glass filler shown in Table 6 and agitated in a tumbler mixer so that the low temperature softening inorganic glass filler (GL2) was attached to the surface of the pellets.

Test strips for evaluation of blister formation were made of thus obtained pellets of the LCP composition in the same manner as above. The blister formation was evaluated in the same manner as above. Results are shown in Table 7.

TABLE 6

Fillers in the LCP composition

| | inorganic glass filler | | fibrous filler | | lamellar/powder filler | |
|---|---|---|---|---|---|---|
| | | amount* | | amount* | | amount* |
| Ex. 8 | GL2 | 0.1 | GF2 | 16.7 | Talc 1 | 50 |
| Com. Ex. 7 | — | — | GF2 | 16.7 | Talc 1 | 50 |

*parts by weight per 100 parts by weight of LCP2

TABLE 7

| | temp. | number of blisters observed on the surface | | | | | | | | | |
|---|---|---|---|---|---|---|---|---|---|---|---|
| Ex. 8 | 290° C. | 0 | 0 | 0 | 0 | 0 | 0 | 1 | 1 | x | x |
| Com. Ex. 7 | 290° C. | x | x | x | x | x | x | x | x | x | x | x: more than 4 blisters were observed on the surface of the test strip

According to Table 7, LCP composition comprising the low temperature softening inorganic glass filler wherein the filler is added to the LCP by just mixing it with the LCP without melt kneading could exhibit suppressed blister formation.

What is claimed is:

1. A liquid crystalline polymer composition comprising: 100 parts by weight of a liquid crystalline polymer, and equal to or more than 0.01 and less than 1 part by weight of a low temperature softening inorganic glass filler whose softening temperature is equal to or less than 550° C.

2. The composition according to claim 1, wherein the low temperature softening inorganic glass filler comprises $P_2O_5$ and ZnO as structural components of the glass.

3. The composition according to claim 1, wherein the low temperature softening inorganic glass filler is a powder filler having a median diameter of 0.1-500μm.

4. The composition according to claim 1, wherein the composition further comprises 1-200 parts by weight of an additional filler selected from fibrous, lamellar, and powder fillers.

5. The composition according to claim 1, wherein the composition is obtained by melt kneading the liquid crystalline polymer and the low temperature softening inorganic glass filler.

6. The composition according to claim 1, wherein the composition is obtained by mixing the liquid crystalline polymer in the form of pellets and a low temperature softening inorganic glass filler so that the low temperature softening inorganic glass filler is attached to the surface of the pellets.

7. The composition according to claim 6, wherein the liquid crystalline polymer in the form of pellets comprises a low temperature softening inorganic glass filler and/or the additional filler dispersed therein.

8. The composition according to claim 4, wherein the fibrous filler is selected from the group consisting of glass fiber, ellipse-shape glass fiber, cocoon-shape glass fiber, silica-alumina fiber, alumina fiber, carbon fiber, aramid fiber, potassium titanate fiber, aluminum borate fiber, wollastonite and a mixture thereof; the lamellar and/or powder filler is selected from the group consisting of talc, mica, graphite, calcium carbonate, dolomite, clay, glass flake, glass beads, barium sulfate, titanium oxide, diatomite and a mixture thereof.

9. The composition according to claim 4, wherein the additional filler is a fibrous filler selected from the group consisting of glass fiber, ellipse-shape glass fiber, cocoon-shape glass fiber, silica-alumina fiber, alumina fiber, carbon fiber, aramid fiber, potassium titanate fiber, aluminum borate fiber, wollastonite and a mixture thereof.

10. The composition according to claim 4, wherein the additional filler is a fibrous filler selected from the group consisting of glass fiber, ellipse-shape glass fiber, cocoon-shape glass fiber and a mixture thereof.

11. The composition according to claim 4, wherein the additional filler is a combination of a fibrous filler selected from the group consisting of glass fiber, ellipse-shape glass fiber, cocoon-shape glass fiber, silica-alumina fiber, alumina fiber, carbon fiber, aramid fiber, potassium titanate fiber, aluminum borate fiber, wollastonite and a mixture thereof, and talc.

12. The composition according to claim 4, wherein the additional filler is a combination of a fibrous filler selected from the group consisting of glass fiber, ellipse-shape glass fiber, cocoon-shape glass fiber and a mixture thereof, and talc.

13. A molded article, which is obtained by molding the liquid crystalline polymer composition according to claim 1.

14. A surface mount type electronic component, which is obtained by molding the liquid crystalline polymer composition according to claim 1.

15. The electronic component according to claim 14, which is mounted with a lead free solder.

16. The electronic component according to claim 14, which is selected from switch, relay, connecter, condenser, coil, trans, camera module, antenna and chip antenna switch.

17. The composition according to claim 1, wherein the liquid crystalline polymer has a crystalline melting temperature determined by differential scanning calorimeter of 280-360° C.

* * * * *